Sept. 30, 1947. W. J. KOLSTAD 2,428,083
ELECTRODE HOLDER
Filed May 9, 1945
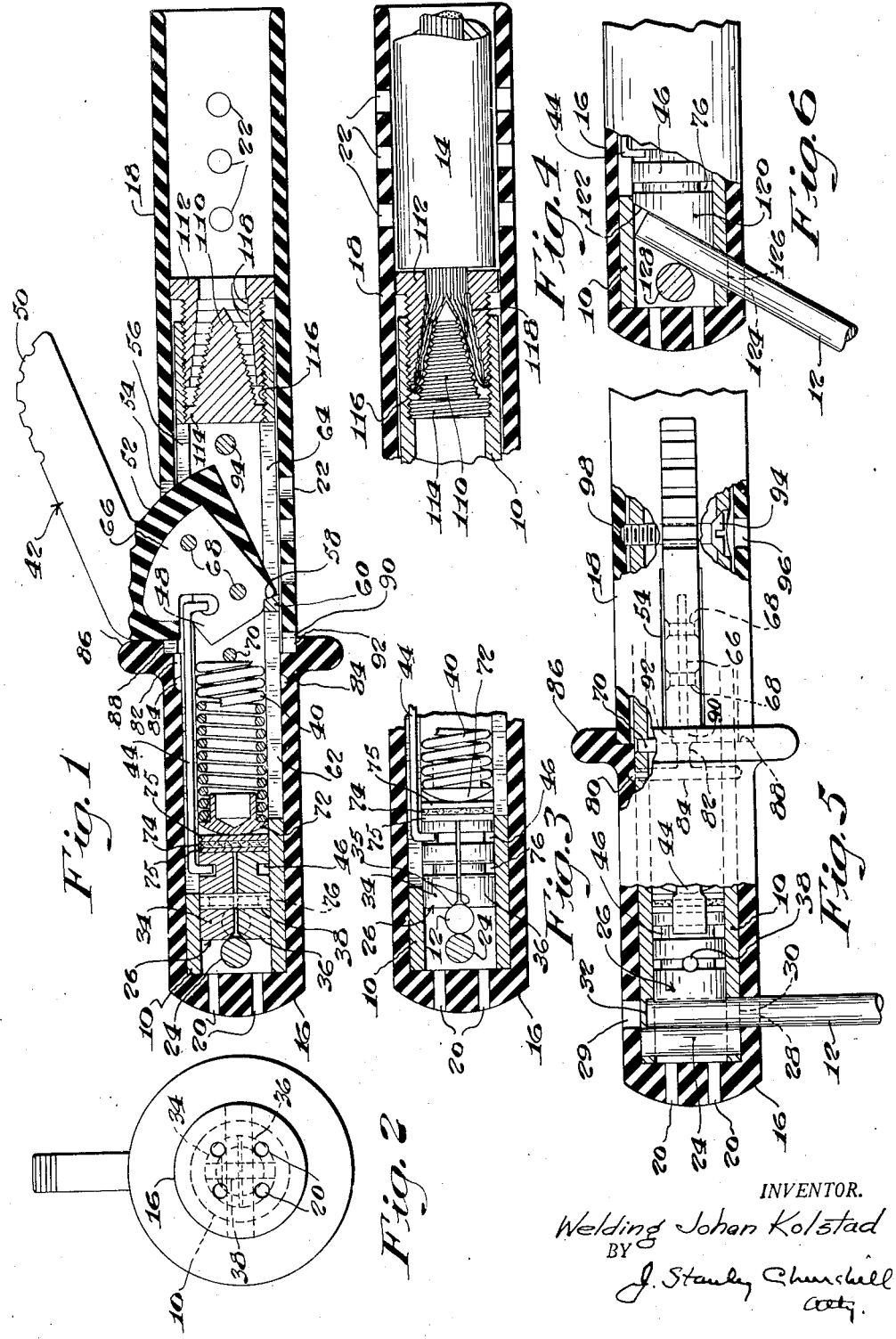
INVENTOR.
Welding Johan Kolstad
BY
J. Stanley Churchill
Atty.

Patented Sept. 30, 1947

2,428,083

UNITED STATES PATENT OFFICE 2,428,083

ELECTRODE HOLDER

Welding Johan Kolstad, Milton, Mass.

Application May 9, 1945, Serial No. 592,865

16 Claims. (Cl. 219—8)

This invention relates to an electrode holder.

The invention has for an object to provide a novel and improved electrode holder of the type employed in welding operations which is efficient in operation, and whose structure is such as to afford maximum protection to the operating parts from the heat of the welding operation whereby to increase the useful life of the holder.

With this general object in view and such others as may hereinafter appear, the invention consists in the electrode holder and in the various structures, arrangements and combinations of parts hereinafter described and particularly defined in the claims at the end of this specification.

In the drawings illustrating the preferred embodiment of the invention, Fig. 1 is a longitudinal cross section of an electrode holder embodying the present invention; Fig. 2 is an end view of the same; Fig. 3 is a cross sectional detail of a portion of the holder shown in Fig. 1 with an electrode inserted; Fig. 4 is a cross sectional detail view of cable connecting means embodied in the present holder with a cable connected thereto; Fig. 5 is a partial plan view of the holder shown in Fig. 1 partly in cross section and with an electrode inserted therein; and Fig. 6 is a detail view partly in cross section of a modified form of electrode holder embodying the present invention.

In general, the present invention contemplates an improved electrode holder of the spring plunger type having a novel and improved construction designed to protect the spring and associated operating parts from the heat of the welding operation and, to this end, provision is made in the present electrode holder for mounting the spring and associated electrode clamping parts in a manner such as to reduce to a minimum heat conduction and current flow through the spring whereby to maintain the latter at a sufficiently low temperature during the welding operation so as to prevent annealing and collapsing of the spring. The present invention also contemplates an improved electrode holder having a structure such as to permit ready dissipation of the heat and which is provided with fully insulated exterior surfaces for maximum safety to the operator.

Another feature of the invention resides in a novel and improved cable connecting terminal embodied in the present holder to be hereinafter more fully described and which is simple in construction and efficient in use.

Referring now to the drawings, the present electrode holder comprises a tubular metallic body portion or sleeve 10 having provision at one end for receiving and yieldingly clamping an electrode 12 and having at its other end a cable connecting terminal to which a cable 14 may be secured. The electrode clamping end of the tubular body portion 10 is provided with an insulating cap member 16 and the remainder of the body portion is protected by an extended insulating handle 18.

The insulating cap member 16 is preferably molded of high heat resisting plastic material and is provided with ventilating openings 20 for dissipation of heat from the unit. The insulating handle 18 may and preferably will comprise grey horn fibre having a low moisture absorbing characteristic and is also provided with ventilating openings 22 to maintain the handle at a temperature comfortable for the welder.

As herein illustrated the electrode 12 is arranged to be clamped in the holder between a stationary contact pin 24 extending across and supported in the walls of the sleeve 10 and a spring-pressed plunger head indicated generally at 26 and which is slidingly mounted within the sleeve 10. In practice, the electrode 12 is inserted through an opening 28 in the cap member 16 and an opening 30 in alignment therewith in the wall of the tubular sleeve 10 and then extended across the interior of the latter to be received in an aligned socket 32 formed in the opposing wall of the sleeve, as best shown in Fig. 5. As thus inserted the electrode 12 is parallel to and in peripheral engagement with the contact pin 24 and is yieldingly clamped into contact with the latter by the plunger 26. The openings 28, 30, 32 may be of a size such as to receive the largest electrode of a group most commonly used, approximately ¼ inch diameter, the smaller sizes being received in the same openings and held against the contact pin 24 by the plunger head in the same manner.

The plunger head 26, as herein shown, is preferably embodied in two semi-cylindrical half sections 34, 36 connected together by a pin 38 fast in one half section and loose in the other half section so as to permit lateral spreading apart of the half sections when urged into engagement with the electrode and to permit movement together as one piece when moved longitudinally into and out of clamping position. The adjacent edges 35 of the half sections 34, 36 are preferably beveled for engagement with the electrode as shown in Fig. 3. Thus, when the plunger head is urged against the electrode the half sections are slightly spread apart as shown to engage the electrode at spaced points and to obtain firm contact with the walls of the current carrying sleeve 10. The stationary contact pin 24 and the cooperating plunger half sections 34, 36 thus provide a three point contact with the electrode assuring equal contact pressures therewith and positive contact of the plunger head with the sleeve 10. The stationary contact pin or rest 24 may and preferably will be mounted in the sleeve in a manner such as to permit renewal or replacement thereof when necessary.

As illustrated in Fig. 1, the plunger head 26 is arranged to be urged into engagement with the electrode by a spring 40 and to be moved into its unclamped position by a hand lever 42 connected to the plunger head by a link 44 having its ends bent at right angles, one end extending into a flattened portion formed in the bottom of a groove 46 in the plunger head, and the other end being hooked under an arm 48 of the lever 42. The lever 42 includes a hand engaging portion 50 and a generally segmented shaped portion 52 which extends through aligned slots 54, 56 formed in the tubular insulating handle 18 and sleeve 10 respectively. The handle is arranged to pivot with relation to the sleeve 10 by being provided with a V-shaped cut out portion 58 adjacent the intersection of the angular sides of the segmental shaped portion 52 which is arranged to engage for pivotal movement against an angular shaped solid portion 60 of the sleeve formed between slotted portions 62, 64 on either side. The hand lever 42 is preferably of an insulating material and may be provided with a metal insert 66 secured thereto by rivets 68 to provide rigidity and to take up the wear at the operating portions, as shown. It will be observed that the slotted portion 64 communicates with some of the openings 22 in the handle 18 thus affording ventilation for dissipation of heat.

From the description thus far it will be observed that when the hand lever is depressed it will pivot on the portion 60 of the sleeve 10 and effect retraction of the plunger head sections to permit insertion or withdrawal of an electrode 12, and, when the lever is released the spring 40 urges the plunger head sections into engagement with the electrode and cooperates with the contact pin 24 to clamp the electrode in the holder. The end of the link 44 in the flattened portion of the groove 46 prevents rotation of the plunger head with relation to the sleeve.

As above stated, provision is made for mounting the spring 40 in a manner such as to effect minimum heat conduction and current flow therethrough so as to maintain the temper therein. As herein illustrated, one end of the spring rests against a relatively small diameter pin 70 extending across and supported in the walls of the sleeve 10 and the other end adjacent the plunger head 26 is provided with a cap member 72 having a conical or convex engaging surface. Interposed between the spring cap 72 and the bottom of the plunger head 26 are three washers including an insulating washer, preferably an asbestos washer 74 faced by two metal washers 75, one on each side of the insulating washer.

With this construction it will be observed that the current flow through the spring is reduced to a minimum, the main portion of the current passing through the sleeve walls and through the contact pin 24 and half sections 34, 36 of the plunger head. It will also be observed that heat conduction is effectively "choked" off at the insulating washer and that the conical or convex engaging surface of the spring cap provides a poor connection for heat conduction and effects maximum heat dissipation. In order to further minimize heat conduction from the plunger head to the spring, the half sections 34, 36 are provided with grooves 76 and 46, the reduced portions thereof serving as "heat chokes" and promoting heat dissipation. Thus, together with the provision of the ventilating openings in the insulating cap 16 and handle 18 and in the sleeve 10, the above described structure maintains the spring and associated parts at a sufficiently low temperature to prevent annealing and softening thereof by the heat and consequent collapsing of the spring. In addition the spring may and preferably will be made from a heat resisting non-corrosive metal to further insure maximum efficiency for a long period of time.

In assembling the unit the insulating cap member 16 is retained on the sleeve 10 by a bayonet joint comprising a pin 80 fast in the wall of the sleeve 10 which is arranged to be received in a longitudinal groove 82 in the cap member and in a connecting circular groove 84 in the cap member when the latter is rotated to present the opening 28 into alignment with the opening 30 in the sleeve. In the event that the cap member becomes charred or worn adjacent the opening 28 therein, the cap may be rotated to move a second opening 29 in the cap member into alignment with the opening 30 in the sleeve. As thus connected the flange portion 86 of the cap member may serve as a stop for the hand lever 42 as shown in Fig. 1. The insulating handle 18 is then placed over the cable end of the sleeve and one end is fitted into a counterbore 88 which may be provided with a lug 90 arranged to be received in a slot 92 in the end of the handle to prevent rotation of the latter with relation to the cap member.

As best shown in Fig. 5, the handle is secured to the sleeve 10 by a screw 94 carried by the latter and to which access is gained through an opening 96 in the handle 18. The screw 94 extends across and through the wall of the sleeve 10 and when tightened the end of the screw projects beyond the sleeve and engages in a depression 98 formed in the interior wall of the handle to thus prevent longitudinal displacement thereof with respect to the sleeve. The sleeve 10 is countersunk for the head of the screw to permit sufficient movement of the screw outwardly to release the handle without the head interfering with removal of the handle. With this construction no part of the metal is exposed thus providing a completely insulated unit and insuring maximum safety to the operator.

The cable connection herein illustrated comprises a novel solderless connector and includes a threaded cone shaped screw 110 and a threaded bushing 112 each arranged to be screwed into the end of the internally threaded sleeve 10 and to cooperate to secure the cable 14 to the sleeve. In use, the threaded flanged end 114 of the cone screw 110 is first screwed into the end of the sleeve and tightened up until it is seated at the bottom of the internally threaded portion 116 of the sleeve as shown in Figs. 1 and 4. The bared end of the cable 14 is then passed through the bushing 112 and assembled with the sleeve, tightening of the bushing in the sleeve effecting spreading of the wires by the cone screw 110 and squeezing of the wires between the cone screw and the bushing. In practice the cable and assembled bushing unit is held stationary while the holder with the cone screw inserted is rotated to screw the same onto the bushing. The tapered thread of the cone screw 110 is preferably rounded to prevent damage to the cable strands and is preferably of the same pitch as the bushing thread so that as the unit is tightened the thread formed in the spread apart wires by the self centering cone screw 110 effects uniform advancement of the wires with the bushing. As herein shown the internal surface of the bushing is tapered and is provided with a plurality of progressively smaller circular grooves 113 forming in effect a series of steps against which the spread apart wires are squeezed to firmly grip the same and to prevent withdrawal of the cable.

A modified form of electrode holder embodying the present invention, as illustrated in Fig. 6, comprises a structure arranged to hold an electrode at a different angle with relation to the axis of the holder. In the modified embodiment, the longitudinally split plunger head 120 is provided with an angular face 122, herein shown as being 30° from the usual right angle position of the electrode with relation to the holder axis, and, the openings 124, 126 in the cap member and sleeve respectively are formed parallel to the angular face of the plunger head. The renewable contact pin 128 may and preferably will be arranged to engage the electrode at right angles thereto, as illustrated in Fig. 6, instead of being parallel thereto as in the previously described embodiment. The disposition of the electrode in the holder at an angle greater than a right angle with relation to the axis of the holder is of particular advantage when it is desired to perform overhead welding operations.

From the above description it will be observed that the present invention provides an electrode holder of the spring plunger type having completely insulated exterior surfaces and in which the spring is mounted and arranged to reduce to a minimum current flow and heat conduction therethrough whereby to afford maximum protection to the spring from the effects of the heat during the welding operation, and, that the provision of heat chokes and adequate ventilating openings contributes to maintaining the holder at a relatively low temperature and at maximum efficiency for a long period of time. In addition, the provision of a spring type clamping unit enables an electrode to be quickly inserted or withdrawn thus effecting a saving of time in the welding operation.

While the preferred embodiment of the invention has been herein illustrated and described it will be understood that the invention may be embodied in other forms within the scope of the following claims.

Having thus described the invention, what is claimed is:

1. In an electrode holder, a metallic sleeve having a stationary contact, a plunger head slidably mounted in the sleeve and arranged to cooperate with said stationary contact to clamp the electrode in the holder, a coil spring for urging the plunger head into clamping position, and means interposed between said plunger head and said spring for reducing to a minimum heat conduction and current flow through said spring said means including a cap shaped to provide a minimum bearing and contact surface and an insulating washer between said cap and said plunger head.

2. In an electrode holder, a metallic sleeve having a stationary contact, and a spring-pressed plunger head slidably mounted in the sleeve and arranged to cooperate with said stationary contact to clamp the electrode in the holder, said plunger head being longitudinally split to form two half sections adapted to be spread apart slightly when urged into engagement with the electrode whereby to force the half sections into firm contact with the sleeve walls and together with the stationary contact forming a three point engagement with the electrode.

3. In an electrode holder, a metallic sleeve having a stationary contact, and a spring-pressed plunger head slidably mounted in the sleeve and arranged to cooperate with said stationary contact to clamp the electrode in the holder, said plunger head being longitudinally split to form two half sections adapted to be spread apart slightly when urged into engagement with the electrode whereby to force the half sections into firm contact with the sleeve walls and together with the stationary contact forming a three point engagement with the electrode said plunger head being provided with grooves to reduce conduction and promote dissipation of heat.

4. In an electrode holder, a metallic sleeve having a stationary contact, a plunger head slidably mounted in the sleeve and arranged to cooperate with said stationary contact to clamp the electrode in the holder, said plunger head being longitudinally split to form two half sections adapted to be spread apart slightly when urged into engagement with the electrode whereby to force the half sections into firm engagement with the sleeve walls and together with the stationary contact forming a three point engagement with the electrode, a coil spring for urging the plunger head into clamping position, and means interposed between said plunger head and said spring for reducing to a minimum heat conduction and current flow through said spring.

5. In an electrode holder, a metallic sleeve having a stationary contact, a retractible spring pressed plunger head slidably mounted in the sleeve and arranged to cooperate with said stationary contact to clamp the electrode in the holder, said plunger head being longitudinally split to form two half sections and being beveled at the electrode engaging edges whereby to effect spreading apart of the half sections when pressed into engagement therewith to force the half sections into firm engagement with the sleeve walls and together with the stationary contact forming a three point engagement with the electrode.

6. In an electrode holder, a metallic sleeve having a stationary contact, a retractible spring pressed plunger head slidably mounted in the sleeve and arranged to cooperate with said stationary contact to clamp the electrode in the holder, said plunger head being longitudinally split to form two half sections and being beveled at the electrode engaging edges whereby to effect spreading apart of the half sections when pressed into engagement therewith to force the half sections into firm engagement with the sleeve walls and together with the stationary contact forming a three point engagement with the electrode said half sections being held in assembled relation by a pin tight in one half section and loose in the other half section to permit said lateral spreading when in clamping position and to permit movement together when retracted and extended in the sleeve.

7. In an electrode holder, an elongated tubular member, a contact pin extending across and supported in the walls of said tube adjacent one end thereof, an opening in the wall immediately below said contact pin and an aligned socket in the opposite wall for receiving an electrode in parallel relation to said contact pin, and a plunger head slidably mounted in the tube and arranged to cooperate with said contact pin to clamp the electrode in the holder, said plunger head being split longitudinally to form two semi-cylindrical half sections adapted to be spread apart when urged into contact with the electrode whereby to force the half sections into firm engagement with said tube and together with said contact pin forming a three point contact with the electrode, said plunger head also being provided with peripheral grooves to reduce conduction and promote dissipation of heat.

8. In an electrode holder, an elongated tubular member, a contact pin extending across and supported in the walls of said tube adjacent one end thereof, an opening in the wall immediately below said contact pin and an aligned socket in the opposite wall for receiving an electrode in parallel relation to said contact pin, and a plunger head slidably mounted in the tube and arranged to cooperate with said contact pin to clamp the electrode in the holder, said plunger head being split longitudinally to form two semi-cylindrical half sections adapted to be spread apart when urged into contact with the electrode whereby to force the half sections into firm engagement with said tube and together with said contact pin forming a three point contact with the electrode, said plunger head also being provided with peripheral grooves to reduce conduction and promote dissipation of heat, a coil spring for urging the plunger head into clamping position, a cap for said spring having a conical bearing surface, and a metal faced asbestos washer interposed between said spring cap and the end of the plunger whereby to reduce to a minimum heat conduction and current flow through said spring.

9. In an electrode holder, a metallic sleeve having a stationary contact, a plunger head slidably mounted in the sleeve and arranged to cooperate with said stationary contact to clamp the electrode in the holder, said plunger head being longitudinally split to form two half sections adapted to be spread apart slightly when urged into engagement with the electrode whereby to force the half sections into firm engagement with the sleeve walls and together with the stationary contact forming a three point engagement with the electrode, a coil spring for urging the plunger head into clamping position, and means interposed between said plunger head and said spring for reducing to a minimum heat conduction and current flow through said spring and means for retracting said plunger head including a hand lever in pivotal engagement with said tubular member and a link connecting said lever to the plunger head.

10. In an electrode holder, a metallic current carrying member having provision at one end for receiving an electrode and at its other end for connection to a cable, an insulating cap member for the electrode receiving end of the current carrying member, an insulating handle for the cable connecting end of the current carrying member, and means for detachably connecting said cap member to said metallic member comprising a bayonet type joint including a grooved portion formed on the interior surfaces of said cap member, said metallic member having a projection arranged to cooperate with said grooved portions, said insulating handle being telescopically fitted with the end of said cap member, and means for detachably connecting the metallic member to the insulating handle, whereby to provide completely insulated exterior surfaces for the holder, said insulating members having ventilating openings therein for dissipation of heat.

11. In an electrode holder, a metallic current carrying member having provision at one end for receiving an electrode and at its other end for connection to a cable, an insulating cap member for the electrode receiving end of the current carrying member having an opening therein through which the electrode is extended, an insulating handle for the other end of the current carrying member, said insulating cap having a second electrode receiving opening, and a detachable connection between said cap and said metallic member arranged to permit rotation of the cap to present said second cap opening in electrode receiving position when the first opening becomes charred or worn, said latter connection comprising a bayonet type joint including a circular grooved portion formed in the interior surfaces of said cap and a communicating straight portion, said sleeve having a projection arranged to cooperate with said grooved portions.

12. In an electrode holder, a metallic sleeve having provision at one end for receiving an electrode and at its other end for connection to a cable, an insulating cap member for the electrode receiving end of the sleeve, an insulating handle for the cable connecting end of the sleeve, means for detachably connecting the cap member to the sleeve, said handle being telescopically fitted with the end of said cap member, and means for connecting the handle to the sleeve comprising a screw supported in and extended across said sleeve and engageable with the interior wall of said handle at a point opposite the point of entrance of said screw, said handle being provided with an opening affording access to said screw.

13. In an electrode holder, a metal sleeve having a stationary contact, and a spring pressed plunger head for engaging an electrode positioned between it and said contact, said plunger head being slidably mounted in the sleeve and comprising a plurality of sections movable radially with respect to the axis of the sleeve and which are arranged to be moved outwardly into firm contact with the sleeve when urged into engagement with the electrode whereby to provide a three point engagement for holding the electrode.

14. In an electrode holder, a metallic sleeve having provision for receiving an electrode, an insulating cap member for the electrode receiving end of the sleeve and an insulating handle for the other end thereof, and means for detachably connecting the cap member to the sleeve comprising a bayonet type joint including a grooved portion formed on the interior surface of said cap member, said sleeve having a projection arranged to cooperate with said grooved portions.

15. In an electrode holder, a metallic sleeve having provision for receiving an electrode, an insulating cap member for the electrode receiving end of the sleeve and an insulating handle for the other end thereof, and means for detachably connecting the cap member to the sleeve comprising a bayonet type joint including a grooved portion formed on the interior surface of said cap member, said sleeve having a projection arranged to cooperate with said grooved portions, said cap member being provided with a counterbore having inwardly extended keys, said insulating handle being telescopically received in said counterbore and having slots arranged to receive said keys to prevent relative rotary movement between said cap and handle, said sleeve being provided with an operating lever arranged to project through one of said slots, thus preventing relative rotary movement of the sleeve with relation to the insulating members.

16. In an electrode holder, a metallic sleeve having provision for receiving an electrode, an insulating cap member for the electrode receiving end of the sleeve and an insulating handle for the other end thereof, and means for detachably connecting the cap member to the sleeve comprising a bayonet type joint including a grooved portion formed on the interior surface of said cap member, said sleeve having a projection arranged to cooperate with said grooved portions, said cap member being provided with a counterbore having inwardly extended keys, said insulating handle being telescopically received in said counterbore and having slots arranged to receive said keys to prevent relative rotary movement between said cap and handle, said sleeve being provided with an operating lever arranged to project through one of said slots, thus preventing relative rotary movement of the sleeve with relation to the insulating members, and means for preventing longitudinal displacement of the handle with relation to the sleeve comprising a screw supported in and extending across said sleeve and engageable with the interior wall of said handle at a point opposite the point of entrance of said screw, said handle being provided with an opening affording access to said screw.

WELDING JOHAN KOLSTAD.

REFERENCES CITED

The following references are of record in the file of this patent:

UNITED STATES PATENTS

| Number | Name | Date |
|---|---|---|
| 1,211,009 | Thornton | Jan. 2, 1917 |
| 1,345,817 | Williams | July 6, 1920 |
| 1,467,028 | Dooley | Sept. 4, 1923 |
| 2,236,372 | Kotchi et al. | Mar. 25, 1941 |
| 2,282,316 | Albert | May 12, 1942 |
| 2,295,546 | Combridge | Sept. 15, 1942 |
| 2,372,251 | Checkos | Mar. 27, 1945 |
| 2,375,836 | Bourque | May 15, 1945 |
| 1,337,662 | La Porte | Apr. 20, 1920 |
| 2,176,137 | Jurkat | Oct. 17, 1939 |
| 2,301,107 | Churchward | Nov. 3, 1942 |
| 2,305,189 | Nowicke | Dec. 15, 1942 |